United States Patent

[11] 3,581,609

| [72] | Inventor | Eugene C. Greenwood<br>468 Prospect Street, Newport Beach, Calif. 92660 |
|---|---|---|
| [21] | Appl. No. | 783,311 |
| [22] | Filed | Dec. 12, 1968 |
| [45] | Patented | June 1, 1971 |

[54] LOCK NUT ASSEMBLY AND BOLT AND WRENCH FOR USE THEREWITH
12 Claims, 6 Drawing Figs.

[52] U.S. Cl. .................................................. 81/121, 51/8
[51] Int. Cl. ........................................... B25b 13/06
[50] Field of Search .......................... 151/28, 8, 29, 6; 81/121, 90

[56] References Cited
UNITED STATES PATENTS

| 859,063 | 7/1907 | Henson | 151/8 |
| 883,102 | 3/1908 | Ellis | 151/8 |
| 761,388 | 5/1904 | Morris | 151/8 |
| 3,464,474 | 9/1969 | Jansen | 151/8 |

*Primary Examiner*—James L. Jones, Jr.
*Attorney*—Hinderstein and Silber

ABSTRACT: A lock nut assembly including a nut having a threaded hole therein adapted for use with a bolt having a groove running at least part of the length of the thread thereon. The nut comprises a central recess which includes a plurality of inwardly extending serrations along a portion of the total depth of the recess. A lock ring having a plurality of serrations extending outwardly from the outer surface thereof is adapted to fit over the bolt and into the recess in the nut where the serrations on the lock ring mate with the serrations on the nut. The lock ring further includes an inwardly extending tongue which is positioned in the groove in the bolt so that the lock ring is axially moveable but not rotatable relative to the bolt, the nut being locked in place when the serrations thereon are in contact with the serrations on the lock ring. A special wrench is provided for separating the lock ring and nut so that the nut may be rotated relative to the bolt.

PATENTED JUN 1 1971 3,581,609

INVENTOR.
EUGENE C. GREENWOOD
BY
ATTORNEYS

LOCK NUT ASSEMBLY AND BOLT AND WRENCH FOR USE THEREWITH

BACKGROUND OF THE INVENTION

1. Field of the Invention

The present invention relates to a lock nut assembly and to a bolt and wrench for use therewith and, more particularly, to a lock nut assembly which holds its position relative to a bolt by a positive mechanical lock, rather that by friction, and which may be relocated or repositioned any number of times without diminishing the torque required for the unintentional loosening thereof.

2. Description of the Prior Art

The nut and bolt, like the lightbulb, the automobile and the telephone, have become integral and indispensable parts of our way of life. It is essentially impossible to do any type of mechanical work without requiring the use of at least one nut and bolt. However, whenever a nut and bolt are used to fasten other parts together, there is the danger that the nut and bolt will loosen and unscrew from vibration or from a turning action between the fastened parts.

Because of this ever present danger, it is common to incorporate some form of friction device between the nut or bolt and the mating part, the most common type of friction device being the conventional lock washer. The friction so generated prevents the parts from rotating relative to each other until the relative torque applied to the nut or bolt reaches a minimum value which is determined by the configuration of the nut, bolt and friction device and the amount of torque initially used to tighten the nut and bolt. At torque levels higher than this minimum value, relative rotation between the nut and bolt occurs and the parts may be screwed or unscrewed.

The use of such friction devices often does not represent an acceptable solution to the problem since it is always possible that the nut or bolt will receive a torque which is above the level required to rotate the parts so that they will loosen and unscrew. An additional problem is that the amount of friction provided by substantially all friction devices decreases with continued use and the torque required to rotate the nut or bolt continually decreases proportionately.

Because of these problems, many attempts have been made to provide a foolproof lock nut and bolt assembly in which the turning torque required to loosen the nut or bolt is as high as the strength of the nut and bolt themselves. However, the previously proposed solutions have not only generally required time-consuming positioning and locking with cotter pins, lock wires, etc., but the turning torque has never approached this ultimate goal.

SUMMARY OF THE INVENTION

According to the present invention, there is provided a radically new concept for a lock nut and bolt in which unrestricted turning of the nut and bolt is permitted in either direction and in which the nut holds its position by a positive mechanical lock in any one of many possible positions. The nut and bolt may be relocated or repositioned any number of times without impairing the locking effectiveness thereof and while still retaining the same ultra-high torque value required to rotate the nut or bolt, this torque value approaching the strength of the nut and bolt. The present lock nut and bolt are particularly suited for use in critical conditions where continuous readjustment is required, and is ideally suited for situations where the nut is subjected to torsion from the parts being held together, such as in the case with axles, rotating shafts, valve pulldown stems, etc. The present lock nut and bolt are totally unaffected by vibration forces and have the added safety advantage that they cannot be easily unscrewed or changed without the aid of a simple but special wrench, thereby defeating vandals or unauthorized tampering.

Briefly, the present assembly comprises a nut having central recess including a plurality of inwardly extending serrations along the face thereof. A floating, captured lock ring comprising an inwardly extending tongue which coacts with a groove running the length of the threads on the bolt to prevent rotation of the lock ring and a plurality of serrations extending outwardly from the outer surface thereof is positioned in the recess, the lock ring being urged by a light spring into the locked position in which the serrations on the ring engage the serrations on the nut, preventing rotation of the nut and locking the nut and bolt together. To move the nut, a special wrench depresses the lock ring against the pressure of the spring, disengaging the serrations and allowing the nut to be rotated to a new position. When the desired location of the nut is reached, the wrench is raised, allowing the serrations on the ring to engage the serrations on the nut. With the serrations engaged, the spring holds the ring in engagement until it is deliberately depressed.

It is, therefore, an object of the present invention to provide a novel lock nut assembly and bolt for use therewith.

It is a further object of the present invention to provide a lock nut assembly which holds its position by a positive mechanical lock rather than by friction.

It is a still further object of the present invention to provide a nut and bolt assembly in which the torque required to rotate the nut or bolt, when in the locked position, approaches the strength of the nut and bolt.

It is another object of the present invention to provide a lock nut and bolt assembly which is totally unaffected by vibration forces.

It is still another object of the present invention to provide a nut and bolt which is totally unaffected by a turning action of the parts they fasten together.

Another object of the present invention is the provision of a special wrench for use with the present lock nut and bolt assembly.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
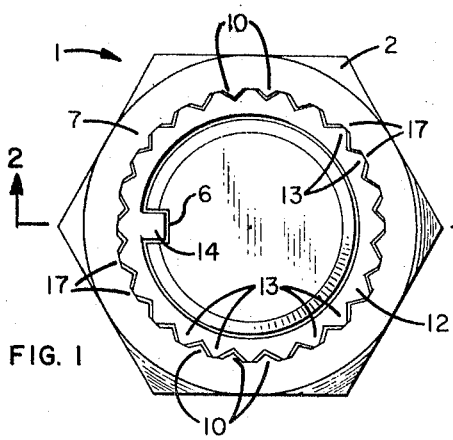
FIG. 1 is a top plan view of the present lock nut assembly and the bolt for use therewith.

Referring now to the drawings, and, more particularly, to FIGS. 1—4 thereof, the present lock nut assembly, generally designated 1, comprising a nut 2 having a standard hexagonal outer surface, is adapted for use with a bolt 3 having a head 4 and a threaded stem 5. In accordance with the present invention, stem 5 is modified to include a longitudinal groove 6 along the outer edge thereof which runs substantially the full length of the threads on stem 5.

For purposes of explanation, nut 2 may be considered as having an upper portion 7 and a lower portion 8, lower portion 8 having a threaded hole therein which engages the threads on stem 5. Upper portion 7 includes a cylindrical recess 9 which is aligned with the centerline of nut 2 and which extends the entire length of upper portion 7. A plurality of inwardly extending serrations 10 are positioned on face 11 of recess 9 around the entire circumference thereof. According to the preferred embodiment of the invention, the depth of the serrated portion of recess 9 is approximately equal to half of the total depth thereof, for reasons which will become apparent hereinafter.

According to the present invention, lock nut assembly 1 further comprises a lock ring or annulus 12 which has a plurality of serrations 13 extending outwardly from the outer surface thereof, serrations 13 on lock ring 12 having the same general dimensions and the same angular spacing as serrations 10 on face 11 of nut 2. Furthermore, although serrations 10 and 13 are shown as having a generally triangular shape, it will be apparent to those skilled in the art that the serrations may have any one of many possible shapes.

The inside diameter of lock ring 12 is slightly greater than the outside diameter of the threads on stem 5 of bolt 3, so that lock ring 12 fits over stem 5 and into recess 9 in nut 2. For maximum strength, the thickness of lock ring 12 should be approximately equal to the depth of the serrated portion of recess 9. When in the position shown in FIG. 2, which is the locked position, serrations 13 on lock ring 12 mate with serrations 10 on nut 2 so that relative rotation of lock ring 12 and nut 2 is prevented. Furthermore, although a space is shown between serrations 10 and 13 in FIGS. 1 and 2, such a showing is purely for the purpose of illustration. In practice, a snug fit between nut 2 and ring 12 is desirable and serrations 10 and 13 would be in contact.

Figure 2:
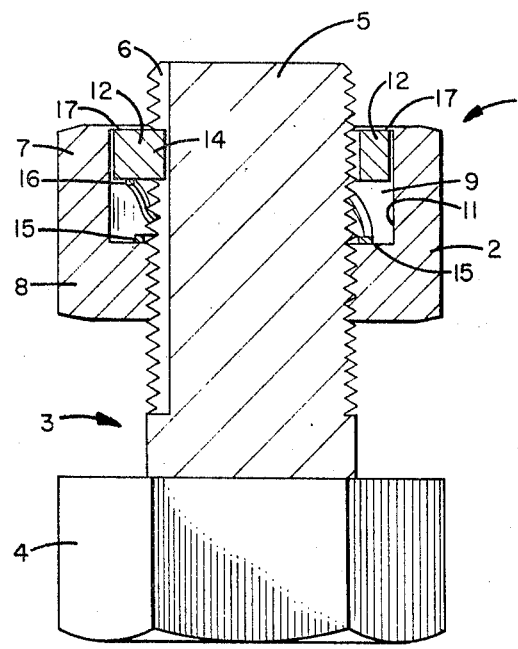
FIG. 2 is a cross-sectional view of the assembly of FIG. 1 taken along the line 2-2 thereof.

Lock ring 12 further includes an inwardly extending tongue 14 whose width and depth are generally the same, but slightly less, than the width and depth of groove 6 in stem 5 of bolt 3. For this reason, and as shown in FIGS. 1 and 2, tongue 14 of ring 12 extends into groove 6 in stem 5 so that lock ring 12 is axially moveable relative to stem 5 but not rotatable relative thereto.

Figure 3:
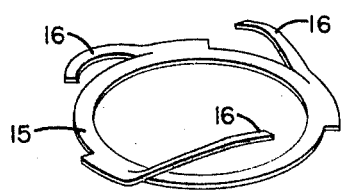
FIG. 3 is a perspective view of a leaf-spring washer adapted for use in the present lock nut assembly.
Figure 4:
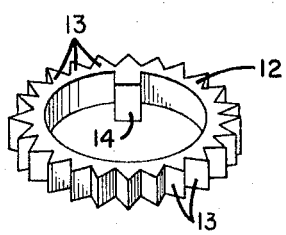
FIG. 4 is a perspective view of a lock ring adapted for use in the present lock nut assembly.

The only remaining portion of lock nut assembly 1 is a means for urging lock ring 12 towards the serrated portion of nut 2. Such means may be any one of many commercially available compressible members. A typical member is shown in FIGS. 2 and 3 and comprises a washer 15, the outer half of which is split to form a plurality of arms 16 which are extended axially to provide a plurality of leaf spring members. Although not shown to scale in FIG. 3, the inside diameter of spring-washer 15 is slightly greater than the outside diameter of the threads on stem 5 and the outside diameter thereof is less than the inside diameter of serrations 10, so that spring-washer 15 readily fits over stem 5 of bolt 3, past serrations 10, and into recess 9 where it is positioned in contact with the base thereof. In addition, leaf springs 16 contact the lower surface of lock ring 12 when lock ring 12 is positioned in recess 9 of nut 2. The main feature of spring-washer 15 is that it provides enough force to hold lock ring 12 in place in contact with serrations 10 on nut 2.

In operation, spring-washer 15 is first inserted into recess 9 in nut 2 whereupon lock ring 12 is inserted therein, depressing leaf springs 16 slightly, to form a unitary assembly. Washer 15, lock ring 12 and nut 2 may be held together by deforming the metal of nut 2 above lock ring 12, as shown at 17, for example, after lock ring 12 has been placed inside recess 9. Spring-washer 15 will then urge lock ring 12 towards the open end of nut 2. Therefore, when at rest, and in the locked position, spring-washer 15 holds lock ring 12 in a position where serrations 13 thereon engage serrations 10 on nut 2. In this position, relative rotation between nut 2 and ring 12 is prohibited. Furthermore, since relative rotation between lock ring 12 and bolt 3 is, at all times, prohibited by tongue 14 extending into groove 6, nut 2 and bolt 3 are securely locked together.

When it is desired to move nut 2, a special wrench, to be described hereinafter, depresses lock ring 12 against the action of spring-washer 15 so that serrations 13 on lock ring 12 disengage serrations 10 on nut 2, thereby allowing nut 2 to be freely rotated to a new position on bolt 3. When nut 2 reaches the approximate location desired, lock ring 12 is released to allow leaf spring 16 of washer 15 to push lock ring 12 up against the bottom side of serrations 10 on nut 2. If serrations 10 and 13 do not immediately engage, as will usually be the case, it is only necessary to adjust nut 2 either slightly looser or slightly tighter to enable serrations 10 and 13 of nut 2 and lock ring 12, respectively, to engage. In the embodiment shown in the drawings, with 24 serrations on nut 2 and lock ring 12, turning of nut 1 a maximum of 15° in either direction will cause serrations 10 and 13 to mesh. Any number of serrations may be provided. As is evident, the more serrations there are, the more positions nut 2 may occupy with reference to bolt 3.

With serrations 10 and 13 engaged, the action of spring-washer 15 holds lock ring 12 in engagement until it is deliberately depressed. Once engaged, nut 2 cannot be turned on bolt 3 without shearing either serrations 10 or 13 or key 14 in groove 6. In this regard, lock ring 12 may have one, two or more tongues 14 matching a like number of grooves 6 in bolt 3 to give added strength to assembly 1.

Figure 5:
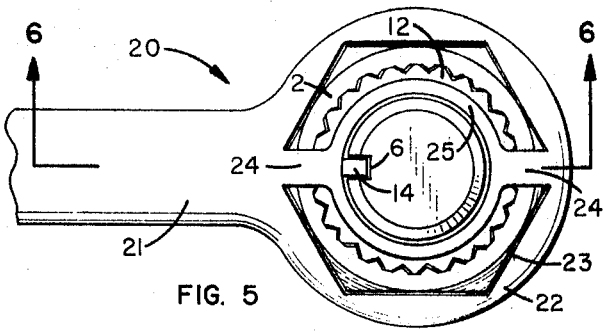
FIG. 5 is a top plan view of a wrench adapted for use with the present nut and bolt showing the nut and bolt in phantom.
Figure 6:
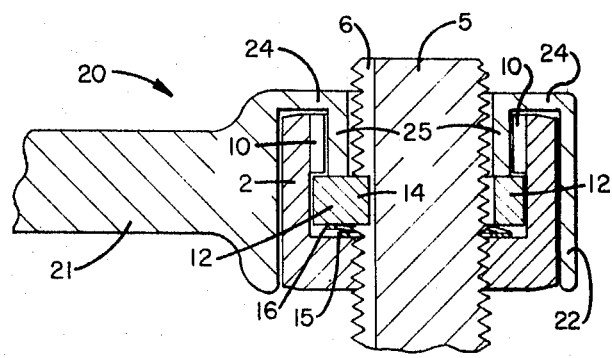
FIG. 6 is a cross-sectional view of the wrench of FIG. 5 taken along the line 6-6 thereof.

Referring now to FIGS. 5 and 6 there is shown a wrench, generally designated 20, for use with lock nut assembly 1. For purposes of explanation, wrench 20 is of the box type, including a handle 21 and a annular head 22 having the usual hexagonal inner surface 23 so that head 22 extends around and engages the outer surface of nut 2. According to the preferred embodiment, head 22 supports, via any number of arms 24, a cylindrical ring 25, the inside diameter of which is slightly greater than the diameter of stem 5 of bolt 3 and the outside diameter of which is limited so that ring 25 contacts only that portion of lock ring 12 which is inwardly of serrations 13.

In operation, the placing of wrench 20 over nut 2 automatically causes ring 25 to depress lock ring 12 against the pressure of spring-washer 15. Therefore, with wrench 20 in place, as shown in FIG. 6, nut 2 may be rotated to any new position. When the desired location of nut 2 is reached, wrench 20 is raised slightly, allowing serrations 13 on ring 12 to engage the bottom side of serrations 10 on nut 2. After wrench 20 is raised by an additional amount sufficient to insure disengagement between the bottom of ring 25 and the top of lock ring 12, wrench 20 may be rotated in either direction, by a slight amount until serrations 10 and 13 snap into engagement. Wrench 20 may then be completely removed and nut 2 and bolt 3 will be securely locked together.

It can, therefore, be seen that according to the present invention there is provided a totally new concept for a lock nut and bolt assembly in which unrestricted turning of the nut and bolt is permitted in either direction and in which the nut holds its position by a positive mechanical lock in any one of many available positions. Nut 1 may be relocated relative to bolt 3 any number of times without impairing the locking effectiveness thereof and without diminishing, by even the slightest amount, the high torque value required to unintentionally rotate the nut or bolt. It can also be readily seen that the present nut and bolt are totally unaffected by vibration forces or relative rotation of the parts secured thereby.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. An assembly, comprising:
    a lock nut having a threaded hole therein adapted for use with a bolt having at least one groove running at least part of the length of the thread thereon, said lock nut comprising:
        a recess aligned with the centerline of said nut and extending along a portion of the length of said nut, said recess including a plurality of inwardly extending serrations along a portion of the depth of said recess; and
    an annulus having a plurality of serrations extending outwardly from the outer surface thereof, said annulus adapted to fit over said bolt and into said recess in said nut, the serrations on said annulus mating with the serrations on said nut, said annulus further having at least one inwardly extending tongue adapted to extend into said groove in said bolt whereby said annulus is axially moveable but not rotatable relative to said bolt, said nut being locked in place when the serrations thereon are in contact with the serrations on said annulus.

2. An assembly according to claim 1 wherein said recess is generally cylindrical in shape.

3. An assembly according to claim 1 wherein the depth of the serrated portion of said recess is approximately equal to half of the total depth of said recess.

4. An assembly according to claim 3 wherein the thickness of said annulus is approximately equal to the depth of said serrated portion of said recess.

5. An assembly according to claim 1 further comprising:
   means for urging said annulus into engagement with said serrations on said nut.

6. An assembly according to claim 5 wherein said means is positioned in said recess between the base thereof and said annulus.

7. An assembly according to claim 5 wherein said means comprises:
   a spring positioned in said recess between the base thereof and said annulus.

8. An assembly according to claim 5 wherein said means comprises:
   a washer positioned in said recess between the base thereof and said annulus, the outer end of said washer being split to form a plurality of arms, said arms extending axially to form a plurality of leaf springs.

9. An assembly according to claim 5 further comprising:
   means for prohibiting removal of said annulus from said recess.

10. An assembly according to claim 5 further comprising:
    a wrench adapted to engage said nut, said wrench including means for disengaging said serrations on said annulus and said nut.

11. An assembly according to claim 10 wherein said disengaging means comprises:
    means for forcing said annulus axially into the unserrated portion of said recess.

12. An assembly according to claim 10 wherein said wrench comprises:
    a head portion adapted to fit over and engage the outer surface of said nut; and
    a generally cylindrical ring supported within said head, said ring adapted to fit over said bolt and to contact and force said annulus axially into the unserrated portion of said recess.